United States Patent [19]

Sigler

[11] Patent Number: 4,640,043
[45] Date of Patent: Feb. 3, 1987

[54] EXPLOSIVE RODENT TRAP

[76] Inventor: Perry J. Sigler, 58740 Dogwood La., St. Helens, Oreg. 97051

[21] Appl. No.: 744,752

[22] Filed: Jun. 14, 1985

[51] Int. Cl.⁴ .............................................. A01M 27/00
[52] U.S. Cl. .......................................................... 43/84
[58] Field of Search .......................... 43/84, 77, 80, 58; 89/1.1, 1.14

[56] References Cited

U.S. PATENT DOCUMENTS

| 725,883 | 4/1903 | Sims | 43/84 |
| 2,729,017 | 1/1956 | Mealey | 43/84 |
| 3,140,556 | 7/1964 | Wagner | 43/84 |

FOREIGN PATENT DOCUMENTS 253258 11/1912 Fed. Rep. of Germany .......... 43/84

OTHER PUBLICATIONS

Col. L. M. McBride, "The Colonel Got His Gopher", *The Explosive Engineer*, May–Jun. 1947, p. 86.

*Primary Examiner*—Nicholas P. Godici
*Assistant Examiner*—K. Rowan
*Attorney, Agent, or Firm*—Chernoff, Vilhauer, McClung & Stenzel

[57] ABSTRACT

An explosive trap for burrowing rodents is comprised of an elastic sack and an associated support frame which are placed in a tunnel that is formed adjacent to the rodent's run. The frame includes a pointed spike which punctures the sack when it expands to a predetermined size upon inflation by the pressurized gas. The resulting explosion provides a concussive shock which kills the rodent. The sack is fluidly connected to an above ground container which can be filled with the pressurized gas through a length of hose, and a valve located at the outlet of the container normally prevents the gas from flowing from the container into the sack. A trigger located outside of the rodent run above its clean-out hole causes the valve to be opened and release the gas from the container, so that it will inflate the sack, when the rodent pushes more dirt out of the clean-up hole. The trigger includes an elongate platform, which is suspended above the clean-out hole by means of a rod which is pushed into the ground, and an elongate arm which is pivotally attached to the platform. In one embodiment the valve is opened by means of a battery energized solenoid when mating nodes located on the arm and platform come into contact upon the arm being raised. In another embodiment the valve is mechanically opened upon upward movement of the arm. The trigger can also be utilized for exploding electrically fired pyrotechnic charges if desired.

11 Claims, 7 Drawing Figures

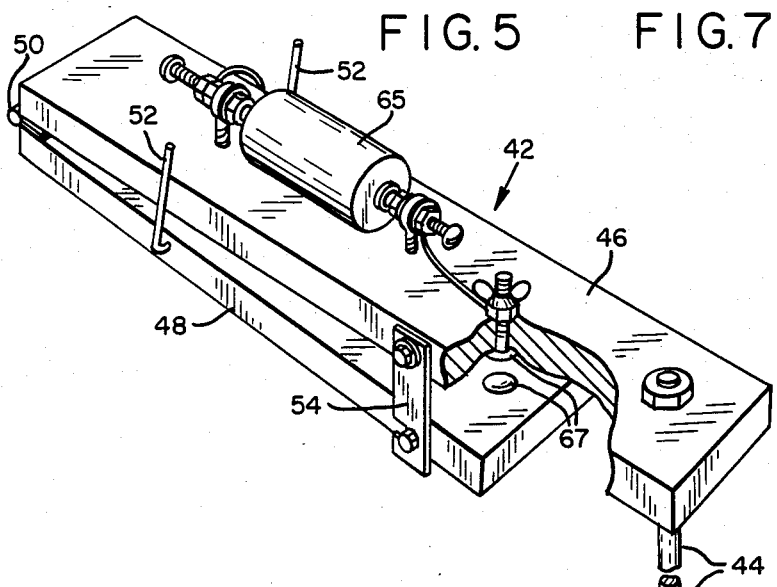
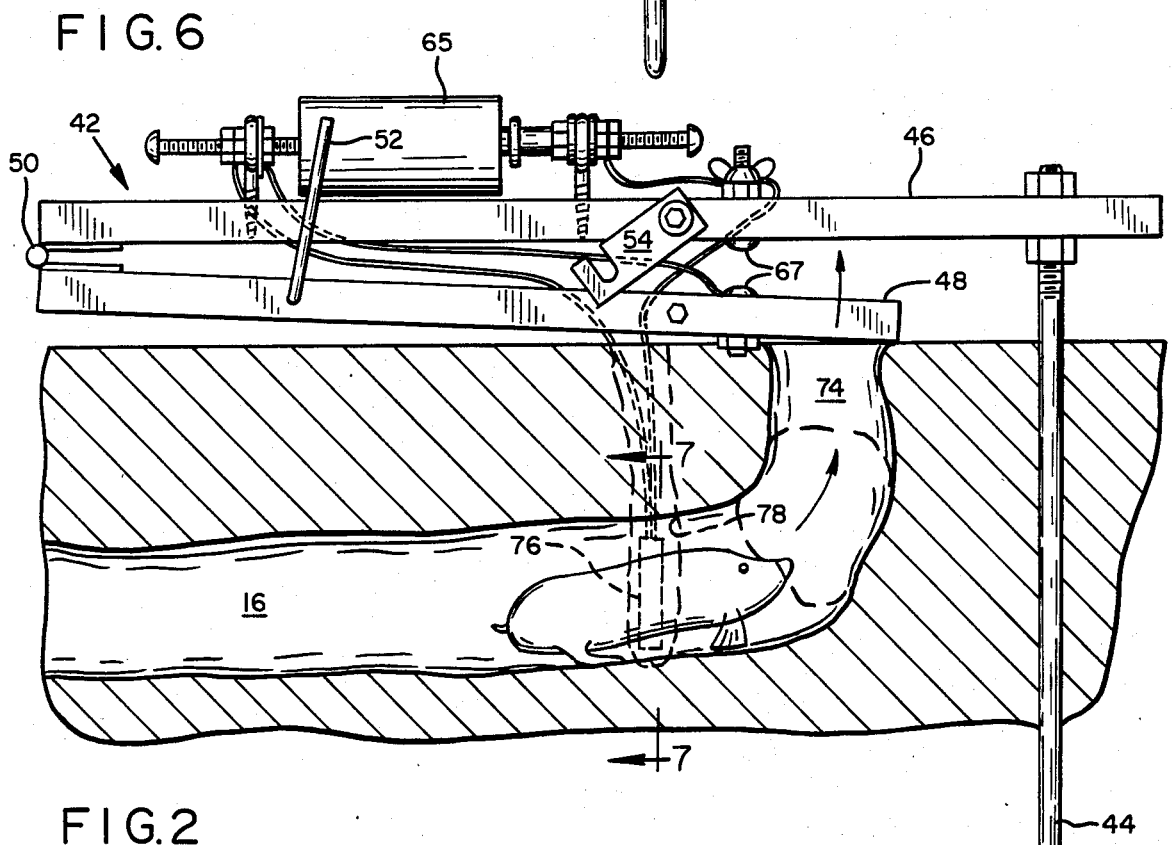
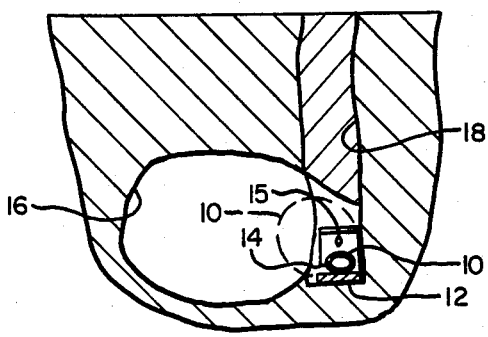

EXPLOSIVE RODENT TRAP

BACKGROUND OF THE INVENTION

This invention relates to an explosive rodent trap and in particular to such a trap which does not require pyrotechnic explosives.

Effective control of burrowing rodents, such as moles and gophers, has proven to be a difficult proposition, yet, control of these pests is important due to the wide spread damage they cause whenever large areas of open ground are maintained in a cultivated state. While widely use, poisoned baits and mechanical traps provide sporatic effectiveness at best. Accordingly, attempts have been made to utilize the sensitivity of burrowing rodents to concussive shock as a means of control. Denninger et al., U.S. Pat. No. 4,213,265, Denninger, U.S. Pat. No. 4,109,406, and Sutton, U.S. Pat. No. 2,809,464, all use the detonation of electrically fired pyrotechnic explosive charges, which are placed in a rodent's run, to kill the rodent. While pyrotechnic explosive charges do kill the rodents when fired in their proximity, their use is potentially dangerous since inadvertent firing of a charge before it has been placed in the ground may cause injury to the user. While the danger can be lessened by properly sizing the charge and by careful handling, pyrotechnic explosive charges are inherently dangerous.

Another, perhaps more limiting, shortcoming of prior art explosive rodent traps is that they commonly are fired when the rodent is separated sufficiently from the charge that the explosion will not affect it. This is due to the fact that such devices heretofore have utilized a trigger which is placed in the run itself. Since burrowing rodents typically are pushing dirt before them when they are traveling in their run, this dirt contacts the trigger which then causes the charge to be fired before the mole has reached the charge. Thus the dirt acts as a barrier which prevents the explosive shock from reaching the rodent. Since the amount of dirt which is being cleared by the rodent at any given time varies, it is extremely difficult to adjust for and proper placement of the charge becomes a matter of chance. While this difficulty certainly can be corrected by increasing the strength of the charge, doing so greatly magnifies the chance of injury due to inadvertent firing. Furthermore, if the charge is large enough to ensure that the shock always reaches the rodent it often will cause the run to be blown out entirely scattering dirt onto people and animals standing near it.

What is needed, therefore, is an explosive rodent trap which does not use pyrotechnic explosives and a trigger for an explosive rodent trap which is located outside of the run and which always will be tripped when the rodent is at a particular location in its run.

SUMMARY OF THE INVENTION

The present invention achieves the foregoing by providing an elastic sack and a frame for supporting it which are placed into a vertical tunnel that is formed immediately adjacent to the rodent's run. The frame has straps to prevent the sack from moving when it is being inflated and a sharp spike located at the end of the frame is arranged to puncture the sack when it expands to a predetermined size upon inflation with a pressurized gas. The sack is connected through a length of hose to an above-ground container which carries a supply of pressurized gas. The container has a valve which allows the gas to be supplied to it by appropriate means. In addition a valve assembly is located between the outlet of the container and the hose which connects it to the sack. This valve comprises a block and a hasp which is pivotally connected to it for movement between a closed position, where the outlet of the container is clamped between the hasp and the block, and an open position, where the outlet of the container is released. A latch secures the hasp in its closed position.

In operation, the valve is closed and the container is filled with pressurized gas. When a trigger, which is associated with the trap, is activated the valve is opened and the pressurized gas flows through the hose into the sack. The sack then is inflated until it reaches a size where it is punctured by the spike in the frame and it explodes, thereby creating the concussive shock which kills the rodent.

The trigger includes an elongate platform which is suspended above the ground over the clean-out hole previously formed by the rodent by means of a rod which extends downwardly from one of its ends. In addition to serving as an element of the trigger, the platform supports the container and valve. Pivotally connected to the other end of the platform is an arm which has the same width as the platform but is somewhat shorter. The end of the arm which is not connected to the platform normally rests on the ground over the clean-out hole but will come into contact with the platform when urged upwardly.

In one embodiment of the invention electrically conductive nodes are located opposite one another on the platform and the arm, and a battery is mounted on the platform. In this embodiment the valve is opened by a solenoid which is electricaly connected between one of the nodes and one terminal of the battery. The other node is connected to the other terminal of the battery to complete the circuit. Thus when the arm is raised to where the nodes come into contact with one another the solenoid is activated and the valve is opened.

In another embodiment, the hasp has a wedge-shaped extremity, and a wheel, which is attached to the arm, is arranged to interact with this extremity and lift the hasp off of the latch when the arm is urged upwardly.

In both embodiments the trigger is positioned such that the free end of the arm is located over the clean-out hole of the rodent's run. Thus as the rodent passes dirt out of the clean-out hole the arm is raised upwardly to activate the trigger. Since the rodent can only clean dirt out of the clean-out hole when directly below it, by placing the sack adjacent to the clean-out hole the rodent will always be positioned at the point of maximum concussion when the trigger is activated.

The trigger of the present invention can also be used to fire pyrotechnic charges and the same advantages are achieved. In this event the charge is connected between one terminal of the battery and one of the nodes and the other node is connected to the opposite terminal of the battery.

Accordingly, it is a principal object of the present invention to provide an explosive trap for burrowing rodents which does not require a pyrotechnic explosive.

It is a further object of the present invention to provide such a trap wherein the force of the explosion can easily be varied.

It is a still further object of the present invention to provide such a trap wherein the explosive element cannot inadvertently be fired before it is placed in the ground.

It is a further object of the present invention to provide such a device where the trigger is located above ground.

It is a further object of the present invention to provide such a device where the trigger will always be activated when the rodent is in a particular portion of its run.

It is a still further object of the present invention to provide a trigger for an explosive rodent trap which is located above ground.

It is a further object of the present invention to provide such a trigger which will only be tripped when the rodent is in a particular portion of its run.

It is a further object of the present invention to provide such a trigger which is tripped when the rodent cleans dirt from its run through a clean-out hole.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 2 is a sectional view taken on the line 2—2 of FIG. 1.

FIG. 5 is a perspective view of the trigger which is an element of the present invention.

FIG. 6 is a side elevational view, similar to FIG. 1, showing another embodiment of the invention.

FIG. 7 is a sectional view taken on the line 7—7 of FIG. 6.

DETAILED DESCRIPTION OF THE INVENTION

Figure 1:
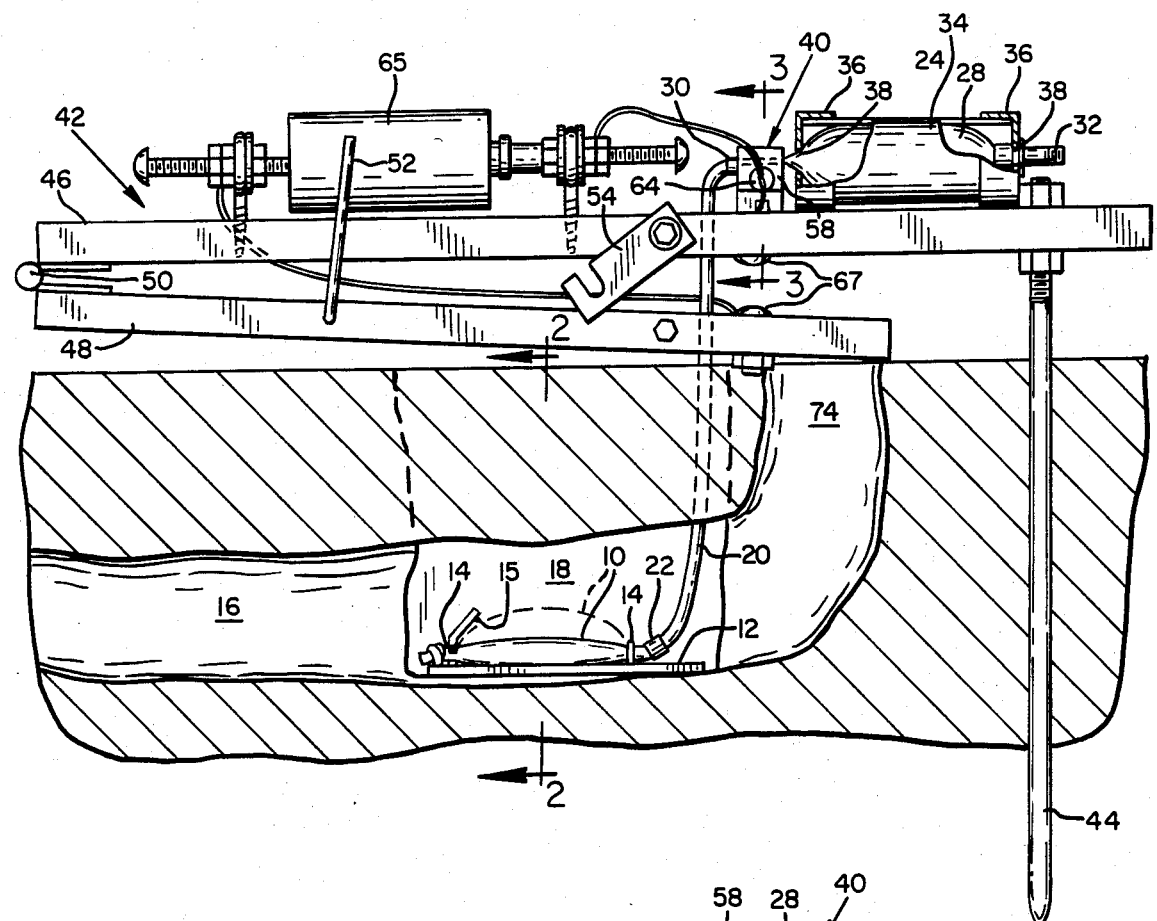
FIG. 1 is a plan view of an explosive mole trap embodying the features of the present invention with the ground in which it is placed being broken away to show hidden detail.
Figure 3:
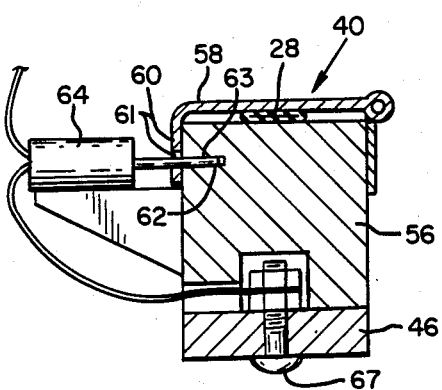
FIG. 3 is a sectional view taken on the line 3—3 of FIG. 1.

Referring to FIGS. 1-3 of the drawings, the present invention comprises an elastic sack 10, which, in the embodiment illustrated, is formed by tying a knot in the end of a length of thin-walled surgical tubing. While other types of sacks could be utilized, surgical tubing not only does not readily deteriorate when exposed to the elements but is highly elastic and easy to puncture, both of which, for reasons which will be explained below, are desirable. The sack 10 is secured to a mounting frame 12 by means of straps 14 which prevent the sack from moving longitudinally when it is filled with a pressurized gas but do not prevent it from expanding.

Mounted on the frame, at a location which is slightly separated from the sack when it is not inflated, is a pointed spike 15. The spike 15 is located relative to the sack such that it will puncture the sack when it has been inflated to a predetermined pressure. It has been found that maximum effectiveness is achieved if the spike is located so that it will puncture the sack when it has been inflated to a pressure of approximately 20 psig. It also has been found that maximum effectiveness is achieved if the frame is not placed in the rodent's run 16, where it may be disturbed, but instead is placed in a vertical tunnel 18 which intersects the side of the run. In order to maximize the percussive effect which occurs when the sack is punctured, that portion of the tunnel above the run should be filled with soil after the frame is placed into the tunnel.

The open end of the sack 10 is connected to a length of hose 20 which is long enough to extend out of the ground when the frame 12 is in position adjacent to the run. A clamp 22 secures the hose 20 to the sack 10. The other end of the hose 20 is attached to a source of pressurized gas, which in the embodiment illustrated is a container 24.

The container 24 contains a bladder 28 which is formed from another length of surgical tubing. The surgical tubing used for the bladder preferably has a thicker wall than that use for the sack since, unlike the sack, it does not have to be punctured and it will be recycled many times during the life of the device. In addition the bladder has approximately three times the volume that the sack has. One end of the bladder is connected to the hose 20 by means of a clamp 30 and the other end is connected to valve assembly 32 such as the valve assembly which is used for inflating an automobile tire. The bladder is contained within a rigid sleeve 34 which has a larger diameter than the bladder. Removably attached to each end of the sleeve are caps 36 having openings 38 located centrally in them with one of the openings being arranged to receive the valve assembly and the other being arranged to receive the bladder.

A valve 40 is located at the end of the bladder which extends out of the sleeve to allow pressurized gas introduced into the bladder through the valve assembly 32 to be retained in it until it is desired to release the gas and allow it to pressurize the sack 10. Details of the valve 40 will be explained in more detail below.

An above-ground trigger 42 opens the valve 40 upon activity of the rodent in its run thereby releasing the pressurized gas from the bladder 28 and allowing it to fill the sack 10 causing the sack to be explosively punctured by the spike 15. In the embodiment illustrated, the trigger 42 comprises an elongate platform 46 which is supported above the ground by means of an elongate rod 44 which is attached to one end of the platform and can be driven into the ground. In addition to serving as a portion of the trigger, the platform serves as a base for mounting the container 24. Located below the platform 46 is an elongate arm 48 which is shorter than the platform but preferably has the same width. One end of the arm is pivotally attached to the end of the platform opposite the end which has the rod 44 by means of a hinge 50. Thus when the platform is suspended above the ground the other end of the arm 48 normally rests on the ground and is spaced apart from the platform. However, the arm will come into contact with the platform when it is moved upwardly. Guides 52 extend from both sides of the arm upwardly past the platform to ensure that the former element does not become misaligned relative to the latter element when it is urged upwardly. A latch 54 located on the sides of the platform and arm allow these elements to be locked in their separated position in order to prevent inadvertent activation of the trigger.

In a first embodiment of the device, shown in FIGS. 1 and 3, the valve comprises a block 56 which is mounted on top of the platform and supports the end of the bladder 28 that extends out of the sleeve 44. A hasp, which is pivotally attached to the block, is movable between a closed position, where the bladder is clamped between it and the block, and an open position where it is separated from the block. The hasp has a latch portion 60 which extends down the side of the block when the hasp is in its closed position and a latch pin 62 extends through aligned openings 61 and 63 in the hasp and block to secure the hasp in its closed position.

An electrically activated solenoid 64, which is attached to the latch pin 62, is arranged to pull the latch pin free from the block, and thus release the hasp, when it is activated. The solenoid receives current, when the trigger is closed, from a battery 65 which also is mounted on top of the platform. Aligned electrically conducted nodes 67 located on mating surfaces of the platform and arm come into contact when the arm is urged upwardly against the platform and separate when the arm is allowed to drop away from the platform. The solenoid is connected in series between one of these nodes and one terminal of the battery and the other node is connected to the opposed terminal of the battery. Thus the solenoid is energized, and the hasp is released, when the arm is urged upwardly into contact with the platform.

Figure 4:
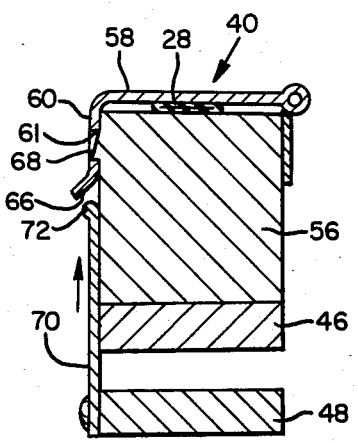
FIG. 4 is a sectional view similar to that of FIG. 3 of another embodiment of the invention.

In another embodiment, shown in FIG. 4, the latch portion 60 of the hasp 58 has a wedge-shaped extremity 66 and the hasp is secured in its closed position due to the opening in the latch portion fitting over a keeper 68 which protrudes from the side of the block. A post 70, extending upwardly from attachment With the arm 48, carries a wheel 72 at its extremity. The wheel is arranged to slide under the wedged extremity of the latch portion of the hasp and thus release the clamp when the arm is urged upwardly toward the platform.

In both embodiments, the device is used by positioning the trigger 42 in a manner such that the platform is parallel to the ground which contains the rodent's run and is separated from the ground by one to two inches. In addition, the unhinged end of the arm 48 is located over a clean-out hole which was previously made by the rodent. This is accomplished by pushing the rod 44 into the ground in a spot which is not above the run 16. A tunnel 18 is then dug beside the run and the frame 12 with the sack 10 attached to it is placed into the tunnel. The hose 20 is connected between the sack and the bladder 28 and the tunnel is refilled with dirt in a manner such that it does not cover the frame. The valve 40 is closed by clamping the end of the bladder between the hasp 58 and the block 56 and it is secured in this position by means of either the latch pin 62 or the keeper 68. The bladder is then inflated through the valve assembly 32 by means of a suitable pump to a pressure which preferably will cause the sack to be inflated to at least 20 psig. If desired the level of explosive force achieved when the sack is burst can be varied by varying the position of the sack on the frame relative to the spike and by varying the pressure of the gas in the container. Since the bladder is not inflated until the sack is under ground, the device by its very nature eliminates the danger of the explosive being triggered accidently while it is being handled.

When the rodent cleans out its run 16, by shoving dirt out of the clean-out hole 74, the arm 48 is urged upwardly against the platform thereby activating the trigger and causing the hasp to be released. The pressurized gas then flows through the tube 20 into the sack 10 which expands as it is filled with the gas. When the sack is expanded to where it comes into contact with the spike 15 on the frame 12 it is ruptured explosively thereby creating a shock wave which kills the rodent.

When the user later notices that the trap has been activated, due to a mound having been formed under the arm, he can remove the dead rodent through the clean-out hole and dispose of it.

Referring to FIGS. 5, 6 and 7, the trigger of the present invention can be used to detonate an electrically fired pyrotechnic charge 76 which is placed into a hole 78 which is formed adjacent to the run 16. In this embodiment one of the terminals of the battery 65 is connected to one of the nodes 67 and the charge is connected between the other terminal of the battery and the other node 67. The trigger is installed and activated in the manner described above.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A device for exterminating burrowing rodents comprising:
    (a) container means for storing a pressurized gas including an opening through which said gas can be discharged;
    (b) valve means for filling said container means with a pressurized gas;
    (c) valve means for preventing the release of said gas through said opening;
    (d) an elastic sack which is interconnected fluidly with said opening on said container means and is capable of being placed into or immediately adjacent to a burrow which was made by a rodent;
    (e) means for explosively puncturing said sack when it is expanded to a predetermined size upon being filled with said pressurized gas; and
    (f) trigger means for opening said valve means upon displacement of dirt caused by movement of said rodent in said burrow.

2. The device of claim 1 wherein said sack is a length of surgical tubing which is tied into a knot at one of the ends thereof and is open at the other of the ends thereof.

3. The device of claim 1 wherein said container means comprises an elastic bladder.

4. The device of claim 3 wherein said bladder comprises a piece of surgical tubing and said means for filling said container comprises an elongate valve assembly which is fastened to said tubing at one of the ends thereof and is open at the other of the ends thereof.

5. The device of claim 4 wherein the open end of said bladder and said sack are connected to opposed ends of a length of flexible hose.

6. The device of c)aim 3 wherein said container further comprises a rigid cylindrical sleeve which is enclosed at each of its ends by means of caps one of said caps defining an opening through which said valve assembly passes and the other one of said caps defining an opening through which the open end of said bladder passes.

7. The device of claim 1 wherein said valve means comprises:
    (a) a seat;
    (b) a hasp;
    (c) means for moving said hasp pivotally relative to said seat between a closed position wherein said open end of said bladder is pinched between said hasp and said seat and an open position wherein said hasp is separated from said seat;
(d) latch means for securing said hatch in its closed position; and
(e) release means for releasing said latch means upon activation of said trigger.

8. The device of claim 1 wherein said trigger means comprises:
(a) a platform;
(b) means for supporting said platform generally parallel to and spaced apart from the ground through which said burrow passes;
(c) an elongate arm located beneath said platform, one end of said arm being pivotally attached to said platform in a manner such that the other end of said arm normally rests on the ground which said platform is supported above and will come into contact with said platform when it is urged upwardly; and
(d) activation means associated with said arm for opening said valve means when said arm is urged upwardly into contact with said platform.

9. The apparatus of claim 7 wherein said trigger means comprises:
(a) a platform;
(b) means for supporting said platform generally parallel to and spaced apart from the ground through which said burrow passes;
(c) an elongate arm located beneath said platform, one end of said arm being pivotally attached to said platform in a manner such that the other end of said arm rests on the ground which said platform is supported above and will come into contact with said platform when said arm is urged upwardly; and
(d) wherein said release means is associated with said arm.

10. The apparatus of claim 9 wherein said hasp includes a wedge-shaped extremity and said release means comprises wheel means for engaging said wedge-shaped extremity when said arm is raised and disengaging said hasp from said latch means.

11. The device of claim 9 wherein said release means comprises:
(a) a electrically activated solenoid which is operably connected to said latch means in a manner to release said latch means when said solenoid is activated;
(b) elecrically conductive nodes located on said platform and on said arm in a manner to come into contact with one another when said arm is raised;
(c) source of electrical energy; and
(d) an electrical circuit connecting said nodes to one another with said source of electrical energy and solenoid being located in series therebetween.

* * * * *